(12) United States Patent
De Haan et al.

(10) Patent No.: US 6,208,760 B1
(45) Date of Patent: *Mar. 27, 2001

(54) METHOD AND APPARATUS FOR MOTION VECTOR PROCESSING

(75) Inventors: Gerard De Haan, Eindhoven (NL); Pierluigi Lo Muzio, Monza (IT); Robert J. Schutten, Eindhoven (NL)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/863,704

(22) Filed: May 27, 1997

(30) Foreign Application Priority Data

May 24, 1996 (EP) .................................... 96201462
Dec. 6, 1996 (SE) ......................... PCTIB9601382

(51) Int. Cl.[7] ...................................... G06K 9/36
(52) U.S. Cl. ...................................... 382/236
(58) Field of Search .................................. 382/232, 235, 382/236, 238, 239, 240; 348/699, 415, 416, 420, 401

(56) References Cited

U.S. PATENT DOCUMENTS

| 5,267,334 | * | 11/1993 | Normille et al. | ............. 382/236 |
|---|---|---|---|---|
| 5,361,105 | | 11/1994 | Iu . | |
| 5,508,744 | * | 4/1996 | Savatier | ............. 348/416 |
| 5,509,089 | * | 4/1996 | Ghoshal | ............. 382/236 |
| 5,515,114 | * | 5/1996 | Murata | ............. 348/699 |
| 5,557,684 | * | 9/1996 | Wang et al. | ............. 382/236 |
| 5,680,482 | * | 10/1997 | Liu et al. | ............. 382/233 |
| 5,706,367 | * | 1/1998 | Kondo | ............. 382/236 |
| 5,724,446 | * | 3/1998 | Liu et al. | ............. 382/233 |
| 5,784,494 | * | 7/1998 | Strongin et al. | ............. 382/233 |
| 5,864,637 | * | 1/1999 | Liu et al. | ............. 382/233 |
| 5,877,866 | * | 2/1999 | Strongin et al. | ............. 382/233 |

FOREIGN PATENT DOCUMENTS 19510389  10/1996  (DE) .
0675652 A1  10/1995  (EP) .

OTHER PUBLICATIONS

M.S.E.E. Graduation Report "Bewegings–Gecompenseerde Interpolatie Van Digitale Televisiebeelden", by L.J. Steenbeek, Delft University of Technology, Dec. 1986, pp. 60–68.

* cited by examiner

*Primary Examiner*—Jose L. Couso
(74) *Attorney, Agent, or Firm*—Edward W. Goodman

(57) ABSTRACT

In a method of furnishing output motion vectors (MV'), motion vectors (MV) are retrieved (DEC) from an encoded image signal (MPEG), and the retrieved motion vectors (MV) are post-processed to obtain the output motion vectors (MV'). The post-processing includes generating (CVG) candidate motion vectors, and selecting (CVS) the output motion vectors (MV') in dependence upon the candidate motion vectors and the retrieved motion vectors (MV).

6 Claims, 1 Drawing Sheet

METHOD AND APPARATUS FOR MOTION VECTOR PROCESSING

BACKGROUND OF THE INVENTION

1. Field of the Invention

The invention relates to a method and device for furnishing motion vectors, and to an image signal processing apparatus and an image display apparatus incorporating such a motion vector processing device.

2. Description of the Related Art

German offenlegunsschrift DE-A-195.10.389 discloses a method and a circuit arrangement for receiving coded video signals. The method concerns a video signal which contains a sequence of images with compressed redundancy, e.g., coded in accordance with the MPEG-2-standard. The motion decoding is carried out first. The post-processing of the motion-decoded fields, this post-processing essentially containing interpolations, is carried out next, together with processing to remove flicker. Advantageously, the motion vectors retrieved at the motion decoding, are used also for the flicker removal.

Motion estimation can be seen as an optimization problem: a sometimes complex, but usually simple criterion function has to be minimized or maximized to find an output motion vector. There are brute force methods that simply try all possible vectors, in a predefined range, in order to be sure to obtain the global optimum of the criterion function. Also, there are efficient approaches that test only the most likely motion vectors. This likelihood is usually determined by spatial or temporal proximity, and, consequently temporal and spatial prediction vectors have been popular in the efficient motion estimation algorithms. Depending on the motion estimation algorithm used, the properties of the resulting motion vector fields are different, so that the application areas of the various motion estimation algorithms are different. Motion vectors can be used in high quality video signal processing, like motion compensated scan conversion, motion compensated noise reduction and image coding. The intended processing puts constraints on various quality aspects of the motion vectors. For example, high quality motion compensated scan conversion requires a motion vector field where the vectors represent the true motion vectors (i.e., true direction and speed) within the image sequence. For coding applications, this is irrelevant, as the only quality criterion is a low average prediction error.

Brute force methods, like full search block matching, tend not to give true motion vectors. Instead, full search block matching minimizes the error between blocks, so its vectors will connect two blocks that have a minimal error between these two blocks, which is suitable for minimizing the prediction error in coding applications. While these minimal errors work efficiently for compression algorithms, like MPEG, the resulting vectors are unsuitable for use in high quality scan conversion. On the other hand, more efficient motion estimators, like 3-D recursive block matching, tend to give true motion vectors that can be used in high quality scan conversion, but which may not be suitable for use in compression algorithms.

With the emergence of MPEG and other types of video compression, it is possible to have input video material that already contains motion vectors, so, at first sight, it may seem that for this type of source material, motion estimation at the receiver side is not necessary. However, it is not certain that these motion vectors can be directly used for, e.g., scan rate conversion, because it is unknown whether the MPEG motion vectors represent true motion or not. At the decoder/receiver side, it is unknown what type of motion estimation algorithm was used at the encoder/transmitter side, so one must assume, as a worst case situation, that the MPEG motion vectors are optimized for an efficient compression, and that they do not represent true motion vectors. For example, a homogeneous background could produce strange and long inconsistent vectors when small changes of brilliance happen in a heterogeneous way. More specifically, periodical structures and noise in picture areas with little detail, may cause such inconsistent vectors. Another problem with motion vectors in MPEG data streams, is that it is uncertain that all motion vectors are transmitted within the data stream. For these reasons, the technique proposed by DE-A-195.10.389 seems not to be suitable for high quality post-processing.

In an attempt to solve a similar problem, it has been proposed to smooth the vectors transmitted with a digitally encoded television signal before using these vectors for a field rate upconversion operation, see the M.S.E.E. graduation report "Bewegingsgecompenseerde interpolatie van digitale televisiebeelden", by L. J. Steenbeek, Delft University of Technology, December 1986, pp. 60–68.

SUMMARY OF THE INVENTION

It is, inter alia, an object of the invention to furnish motion vectors which are suitable for high quality post-processing. To this end, a first aspect of the invention provides a method of furnishing output motion vectors. A second aspect of the invention provides a device for furnishing output motion vectors. A third aspect of the invention provides an image signal processing apparatus including such a device. A fourth aspect of the invention provides an image display apparatus including such an image signal processing apparatus.

In a method of furnishing output motion vectors in accordance with a primary aspect of the present invention, motion vectors are retrieved from an encoded image signal, and the retrieved motion vectors are post-processed to obtain the output motion vectors. The post-processing includes generating candidate motion vectors, and selecting the output motion vectors in dependence upon the candidate motion vectors and the retrieved motion vectors.

These and other aspects of the invention will be apparent from and elucidated with reference to the embodiments described hereinafter.

DESCRIPTION OF THE PREFERRED EMBODIMENT

The problems described in the above background part do not exclude the MPEG motion vectors entirely from use in high quality scan conversion. When an appropriate post-processing is applied, the MPEG motion vectors can be made useful. More specifically, when the receiver is able to determine the quality of the MPEG motion vectors, and when it is able to improve the quality of the MPEG motion vectors so that they meet certain criteria for the intended processing, the MPEG motion vectors can be used. Several possible post-processing methods to extend the applicability of the MPEG motion vectors are considered:

1. Process the MPEG motion vectors with an operation, like some sort of vector smoothing operation to increase the usability of the MPEG motion vectors.
2. Use the MPEG motion vectors as additional candidates along with spatial and/or temporal candidates in, for instance, a 3-D recursive block matching algorithm, similar to the use of an additional parametric vector candidate as disclosed in the non-prepublished European Patent Application No. 96201462.7, file May 24, 1996, incorporated by reference herein (attorney's docket PHN 15,824). For a description of an efficient recursive motion vector estimation algorithm which obtains motion vectors on the basis of several candidate vectors, reference is also made to the articles by Dr. G. de Haan et al. listed at the end of the description of the non-prepublished European Patent Application No. 96201462.7.
3. The MPEG motion vectors can be used to calculate the parametric vector candidates described in the non-prepublished European Patent Application No. 96201462.7.

Figure 1:
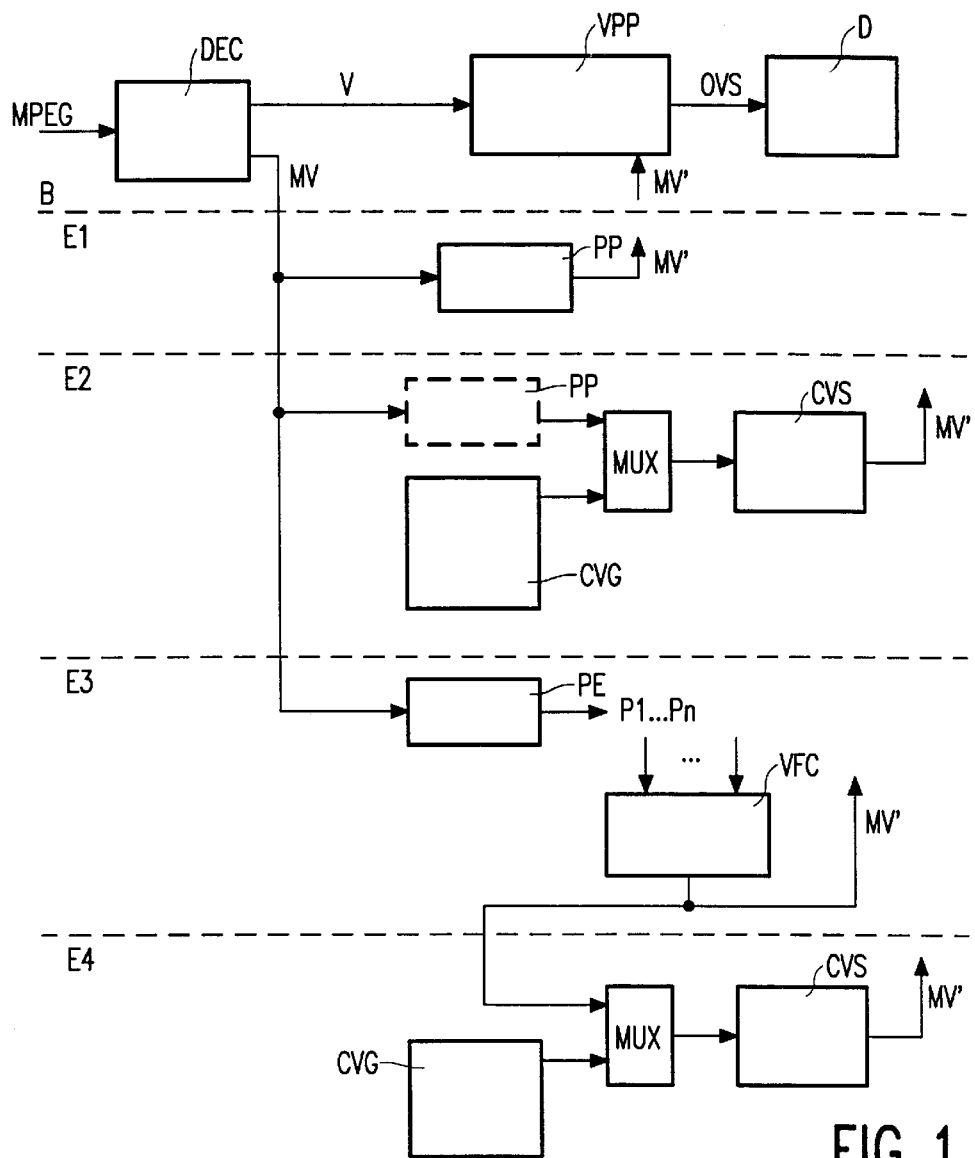
FIG. 1 illustrates in a schematic form various embodiments of an image display apparatus having a motion vector furnishing device in accordance with the present invention.

For a schematic description of the various embodiments, reference is made to FIG. 1.

FIG. 1 shows a basic section B, and four sections E1 ... E4, showing four distinct ways to augment the basic section B to obtain four distinct embodiments B+E1, B+E2, B+E3, and B+E3+E4 of an image display apparatus.

In the basic section B, an MPEG signal, comprising a video signal V and motion vectors MV, is applied to a decoder DEC in order to retrieve the video signal V in dependence upon the motion vectors MV from the MPEG input signal. The video signal V is applied to a video post-processor VPP to obtain an output video signal OVS having a doubled field frequency and/or line frequency or an improved motion portrayal with respect to the video signal V. Alternatively or in addition, the video post-processor VPP reduces noise and/or changes the number of pixels per line and/or lines per field of the video signal V. The video post-processing carried out by the processor VPP is dependent on improved motion vectors MV'. The output video signal OVS is displayed on a display device D.

In accordance with a first embodiment B+E1, the improved motion vectors MV' are obtained from the motion vectors MV contained in the MPEG signal by means of a post-processor PP. For example, a smoothing operation will reduce most of the artifacts which would arise if the MPEG motion vectors MV were directly used for the video post-processing carried out by the processor VPP. A smoothing operation may include separate low-pass filtering operations on the horizontal and vertical components of the motion vectors. Alternatively, the horizontal and vertical components of the motion vectors can be applied to median filters to replace extreme motion vector component values by existing motion vector component values of motion vectors of neighboring blocks of picture elements.

In accordance with a second embodiment B+E2, the MPEG motion vectors MV are multiplexed by a multiplexer MUX with candidate vectors generated by a candidate vector generator CVG, optionally after a (e.g., smoothing) post-processing operation carried out by the post-processor PP. The multiplexed vectors are applied to a candidate vector selector CVS to obtain improved motion vectors MV' which are expected to show the smallest errors.

In a third embodiment B+E3, a parameter extractor PE extracts motion parameters p1 ... pn from the MPEG motion vectors MV. The motion parameters p1 ... pn are applied to a vector field calculator VFC to obtain the improved motion vectors MV'. Reference is again made to the non-prepublished European Patent Application No. 96201462.7 and its corresponding applications for further details.

In a fourth embodiment B+E3+E4 which is covered by the claims of the motion vectors calculated by the vector field calculator in section E3 are multiplexed with candidate motion vectors from the candidate vector generator CVG, and applied to the candidate vector selector CVS to obtain the improved motion vectors MV'. This fourth embodiment combines the features of the second and third embodiments.

Figure 2:
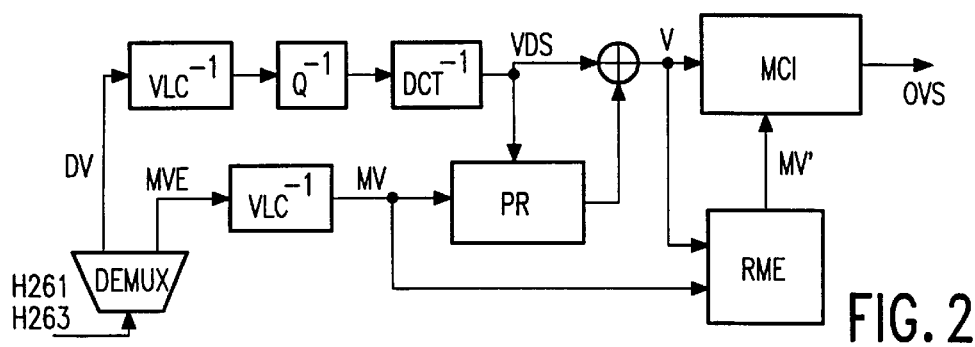
FIG. 2 discloses a H261/263 decoder with post-processing in accordance with the present invention.

Obviously, the present invention is not limited to MPEG signals; other signals, like H261 or H263 signals, can be treated in the same manner. FIG. 2 discloses a H261/263 decoder with post-processing in accordance with the present invention. A H261 or H263 input signal is applied to a demultiplexer DEMUX to obtain a digital video signal DV and motion vectors MVE. The motion vectors MVE are applied to a variable length decoder $VLC^{-1}$ to obtain decoded motion vectors MV. The digital video signal DV is applied to a cascade connection of a variable length decoder $VLC^{-1}$, an inverse quantizer $Q^{-1}$, and a discrete cosine transform (DCT) decoder $DCT^{-1}$, to obtain a video difference signal VDS. The video difference signal VDS and the motion vectors MV are applied to a prediction block PR, whose output is added to the video difference signal VDS to obtain the decoded video signal V. The decoded video signal V and the motion vectors MV are applied to a recursive motion estimator RME to obtain improved motion vectors MV', in dependence on which, the decoded video signal V is processed by a motion-compensated interpolator MCI to obtain an output video signal OVS. In a sequence of coded images comprising intra-frame coded images (which stand alone), predictively coded images (which can be decoded by means of a preceding intra-frame decoded image or a preceding decoded predictively coded image, and the motion vectors MV), and bi-directionally coded images, between an intra-frame coded image and a predictively coded image or between two predictively coded images, the improved motion vectors MV' are preferably used to decode (i.e., interpolate) the bi-directionally coded images.

The embodiment of FIG. 2 can be implemented on a PC add-on card in a multi-media PC.

The basic considerations underlying a primary aspect of the present invention can be summarized as follows. Different motion estimation algorithms will have different applications based on the properties of their resulting vector fields. MPEG video data streams contain motion vectors, which can possibly be used in high quality video processing. However, it is likely that these MPEG motion vectors are optimized to achieve an efficient compression, so that these vectors cannot be expected to represent the true motion. This means that additional processing is needed to improve their quality and usability for a high quality post-processing. It is proposed to process the MPEG motion vectors at the receiver side. For instance, they can be used as additional candidate vectors in an efficient motion estimator. In this manner, the applicability of MPEG motion vectors is extended.

The following salient features of the preferred embodiments of the present invention can be mentioned. A post-operation on motion vectors, that are received along with a video signal, intended to further increase a quality aspect of said vectors like, e.g., their spatial and/or temporal smoothness, so that they can be used for high quality video signal processing. A post-operation on motion vectors, that are received along with a video signal, where the motion vectors are used, possibly after a post processing, as additional candidates for some, or all, of the blocks in an efficient motion estimator that uses a limited set of possible vector candidates. An operation where the motion vectors are used the generate the parameters of a parametric model that describes the global motion within the video sequence. An operation where these extracted parameters are used to generate additional candidates for some, or all, of the blocks in an efficient motion estimator that uses a limited set of possible vector candidates.

It should be noted that the above-mentioned embodiments illustrate rather than limit the invention, and that those skilled in the art will be able to design many alternative embodiments without departing from the scope of the appended claims. The invention can be implemented by means of hardware comprising several distinct elements, and by means of a suitably programmed computer.

What is claimed is:

1. A method of furnishing output motion vectors, the method comprising the steps:

retrieving motion vectors and a separate video signal from an input signal comprising an encoded image signal; and post-processing the retrieved motion vectors to form the output motion vectors, wherein the post-processing step includes the steps:
generating candidate motion vectors independent of said retrieved motion vectors; and
selecting said output motion vectors in dependence upon said candidate motion vectors and said retrieved motion vectors.

2. The method as claimed in claim 1, wherein the post-processing step includes the step:

subjecting said retrieved motion vectors to a smoothing operation to form smoothed vectors, and wherein in said selecting step, said output motion vectors are selected from said candidate motion vectors and said smoothed vectors.

3. A method of furnishing output motion vectors, the method comprising the steps:

retrieving motion vectors and a separate video signal from an input signal comprising an encoded image signal; and post-processing the retrieved motion vectors to form the output motion vectors, wherein the post-processing step includes the steps:
generating candidate motion vectors;
extracting motion parameters from said retrieved motion vectors;
calculating parametric motion vectors in dependence upon said motion parameters; and
selecting said output motion vectors from said candidate motion vectors and said parametric motion vectors.

4. A device for furnishing output motion vectors, the device comprising:

an input for receiving an input signal comprising an encoded image signal;

means for retrieving motion vectors and a separate video signal from said input signal; and means for post-processing the retrieved motion vectors to form the output motion vectors, wherein the post-processing means comprises:
means for generating candidate motion vectors independent of said retrieved motion vectors; and
means for selecting said output motion vectors in dependence upon said candidate motion vectors and said retrieved motion vectors.

5. An image signal processing apparatus, comprising:

an output motion vector furnishing device as claimed in claim 4;

means for providing a decoded image signal in response to said encoded image signal; and means for post-processing said decoded image signal in dependence upon said output motion vectors, to form a post-processed image signal.

6. An image display apparatus, comprising:

an image signal processing apparatus as claimed in claim 5; and means for displaying said post-processed image signal.

* * * * *